United States Patent [19]

Burkhardt

[11] Patent Number: 4,712,670
[45] Date of Patent: Dec. 15, 1987

[54] MECHANISM FOR THE TRANSPORTATION OF OBJECTS

[76] Inventor: Volker Burkhardt, Lerchenstr. 29, D-7085 Bopfingen, Fed. Rep. of Germany

[21] Appl. No.: 799,844

[22] Filed: Nov. 18, 1985

[30] Foreign Application Priority Data

Dec. 12, 1984 [DE] Fed. Rep. of Germany ....... 3445249

[51] Int. Cl.⁴ .............................................. B65G 17/24
[52] U.S. Cl. ............................ 198/803.01; 198/465.1; 198/779
[58] Field of Search ................... 198/465.1, 465.3, 779, 198/803.2, 803.01, 860.3, 836, 861.1

[56] References Cited

U.S. PATENT DOCUMENTS

| 3,690,433 | 9/1972 | Buldini | 198/465.3 X |
| 3,949,859 | 4/1976 | Nussbaumer et al. | 198/803.2 X |
| 4,062,444 | 12/1977 | Nakov et al. | 198/779 X |
| 4,088,220 | 5/1978 | Jacksch et al. | 198/465.3 X |
| 4,442,935 | 4/1984 | Gregg | 198/836 X |
| 4,501,353 | 2/1985 | Burkhardt | 198/779 |
| 4,564,100 | 1/1986 | Moon | 198/465.3 |
| 4,598,818 | 7/1986 | Miller | 198/465.3 X |

FOREIGN PATENT DOCUMENTS

| 2712214 | 9/1978 | Fed. Rep. of Germany ... 198/465.3 |
| 2735987 | 3/1979 | Fed. Rep. of Germany ...... 198/779 |

Primary Examiner—Robert J. Spar
Assistant Examiner—Lyle Kim
Attorney, Agent, or Firm—Hayes, Davis & Soloway

[57] ABSTRACT

A mechanism for the transportation of objects has an endlessly rotating roller chain (4) supported and guided by a support structure (1). Pallet-like sliding carriages (12) are situated on the roller chain (4) for receiving objects to be transported. The sliding carriages (12) are conveyed by guide elements (17,23) engaging tracks (18,25) of the support structure (1). The sliding carriages (12) are connected in straight conveyor sections with the roller chain (4) for conveyance therealong by friction-carrier elements (29) and are connected in curved conveyor sections with the roller chain (4) by roller engaging recesses (34).

13 Claims, 3 Drawing Figures

MECHANISM FOR THE TRANSPORTATION OF OBJECTS

The invention concerns a mechanism for the transportation of objects upon an endlessly rotating roller chain that runs in or upon a support structure.

A roller chain can be used, for instance, as a baffle conveyor chain guided on tracks in or upon support structures. Such a roller chain consists of conveyor rollers of large diameters and next to them lateral tread rollers which are supported on the tracks. A multiplicity of separate links consecutively arranged in series interconnecting the rollers results in an endless roller chain. A roller chain of this kind has been described, for example, in German Utility Model 82 27 706. A support structure that serves as support for the roller chain and is provided with corresponding tracks has, for instance, been described in German Pat. No. 31 48 177. Instead of a baffle conveyor chain having a large central conveyor roller and lateral tread rollers, there are also tread roller chains which as so-called triplex chain or triple roller chain serve for the transportation of objects.

In the case of large objects it is also possible to use instead of only one roller chain situated in a support structure, two roller chains conveyed in support structures and arranged side-by-side spaced apart from each other, the goods to be transported resting on both roller chains.

Larger objects or objects having contact surfaces can be placed without problem directly on the baffle roller chain. Smaller objects or objects having no contact surface with which they can be safely placed on the roller chain are transported on pallets having adequately constructed upper sides for accommodating the objects. In this case the pallets are placed on the roller chain.

However, there is in this case a disadvantage in that the pallets must be removed from the mechanism at the point of destination and be separately transported back to the starting point where they are again mounted on the roller chain. This procedure is relatively expensive and can result in interruptions in the transportation. In addition, separate means are needed for returning the emptied pallets.

This invention is therefore directed to the problem of providing a mechanism of the kind described above with which it is possible to transport objects of any kind and shape safely, quickly and without complication as well as one which is simply constructed and requires to a large extent, few additional means or parts.

According to the invention this problem is solved by disposing pallet-like sliding carriages upon the roller chain for receiving the objects to be transported, said sliding carriages being guided by guide elements engaging tracks in the support structure and being in contact with the roller chain for conveyance by friction-carrier elements in straight conveyor sections and by roller engaging recesses in curved conveyor sections.

Instead of pallets, which are only superposed up on the roller chains, there are now used according to the invention siding carriages connected with the roller chain either by friction or by resiliently overridable positive engagement in a manner such that the sliding carriages endlessly rotate together with the roller chain. In this embodiment no separate return of the pallets is required. Rather the sliding carriages return to the point of departure together with the roller chain after being emptied. Notwithstanding this, the ability of the conveyor to accumulate conveyed articles at bottlenecks has been maintained. Since the sliding carriages in straight conveyor sections are connected with the roller chain merely by frictional locking, in case of deceleration as during the starting or mounting of the sliding carriage or carriages, the roller chain can pass through underneath them. But in order that they can be safely conveyed in curved conveyor sections, the sliding carriages are in these ranges connected with the roller chain by roller engaging recesses.

The upper side of the sliding carriages can be shaped in any manner desired such that objects of any kind and shape, for example, round parts such as shafts, sprocket wheels and the like can be transported.

The mechanism according to the invention is relatively simply built and almost no additional parts are necessary. Specifically, no separate return means for the pallets is needed.

In developing the invention it can be provided that the friction-carrier elements be constructed as carrier bars situated on the underside of the sliding carriages and compressible against the rollers of the roller chain.

Here the carrier bars are made generally long enough so that several rollers lie underneath the carrier bar. The carrier bar must cover at least three baffle rollers to prevent a constant tilting of the bars during deceleration. This results in a good carrying force which depends on the spring tension. The carrier bars can be hereof any shape (though they must be even). It is of the essence that the carrier bars or the springs produce a contact force sufficient to carry along the sliding carriages to which they are attached. If needed, the strength of the contact pressure can also be adjustable.

For the sake of simplicity the roller engaging recesses are in general situated on the carrier bars and become operative in curved conveyor sections.

While the underside of the carrier bar can adequately be compressed against two, three or more rollers when it lies on a straight path generally parallel with the direction of transportation, the frictional engagement in curved sections will generally no longer suffice to carry along a sliding carriage inasmuch as there is now support only on one roller, which, incidentally, continues to be in the longitudinal central plane of the sliding carriage. The remaining rollers are actually lifted from the carrier bars in the curved ranges. If now the carrier bar has in the underside a recess according to the invention, then as a result of the contact pressure of the carrier bar, for instance, via resilient members such as springs, one roller can engage in the recess and thus carry along in form-locking manner the sliding carriages. This is automatically the case when a roller of the continuous roller chain comes into the area of a recess.

The recess is simply an arcuate cavity having its radius adapted to the diameter of the underlying roller. The recess will also generally be in this case in the longitudinal central plane of the sliding carriage.

As guiding elements for each sliding carriage there can be provided a track extending parallel with the roller chain situated laterally on the support structure, there being conveyed in said track at least one tread roller in the direction of transportation as guide element. Here the tread rollers also act to transmit the stresses and weights that occur from the sliding carriage to the support structure.

The tracks here can be introduced directly into the support structure in lateral grooves; otherwise, a U-section laterally secured on the support structure serve this purpose. The inner side of the U-section can at the same time serve as a track for the tread rollers.

In general two tread rollers are provided, one on each side.

For lateral conveyance it can further be provided that there be disposed on the sliding carriage adequate devices which likewise act upon the support structure.

The devices for this can each have laterally disposed on the support structure, for instance, a track upon which at least one guide roller moves.

In this manner it is ensured also that the sliding carriage is safely conveyed in the course of direction of the roller chain.

The track can be advantageously formed from the free end of one leg of the U-section.

In this case the U-section assumes a double function. In the curved range the U-section is likewise curved.

For adequate lateral stability there are generally disposed on each side on the sliding carriage at least two consecutive rollers spaced apart.

Since one guide roller will be generally disposed respectively in the front and in the rear areas of the sliding carriage, this means that in curved and return ranges, said two guide rollers stand diagonally, thus carrying out on their guide track slip motions diagonal to the course of direction.

If the resultant increased friction and the consequent wear and tear on the guide rollers are to be prevented, it should be provided that there be disposed between both guide rollers in the area of the longitudinal pivot axis of the sliding carriage a third guide roller that is at a greater distance from the top side of the sliding carriage than the two other guide rollers and that in curved and reverse ranges moved on a curved track, both guide rollers being disposed in this area so as not to have any further contact with their track.

Sliding and friction movements are thereby very advantageously prevented.

This is achieved by the fact that the two outer guide rollers absolutely do not touch in curved range guideways now situated somewhat lower; rather the guide roller situated in the longitudinal central plane or longitudinal pivot axis of the guiding carriage assumes guidance in this range.

When the track at one leg of the U-section is on the free end of the leg, it is necessary that the latter be accordingly shorter only in the curved range. On the other hand, there will be provided in the radially inner area an additional curved track upon which the central guide roller then moves.

The conveyor mechanism according to the invention can be equipped with straight horizontal transportation and return tracks and with vertical curved ranges whereby the roller chain, together with the sliding carriage situated thereon, runs back below the transportation track and via a second curved range is again upwardly lifted to the transportation level above.

However, it is obviously possible to construct the transportation mechanism according to the invention in only a horizontal plane. In this case the curved ranges at the beginning and at the end of the transportation track adhere to the same level, that is, the return track is laterally parallel beside the transportation track. In this case the support structure, the roller chain and the sliding carriages are tilted 90° in comparison with the above-mentioned construction.

If as result of the weight stresses that appear at the side there should be required additional supports on the support structure, this is possible without problem. For this purpose the tread rollers can be shaped for guiding the sliding carriages and the guide rollers for lateral guidance. Thus, it is also possible to arrange, for instance, rotatably, for pivot of the guide rollers. In this case the guide rollers can be adjusted in curved and return ranges and the central guide roller can be eliminated if desired.

Embodiments of the invention are herebelow described in detail with reference to the drawings in which.

The mechanism according to the invention has a support structure 1 which can be, for instance, curved and straight conveyor sections connected together end-to-end to form a substantially oval endless path. Its construction can be more clearly seen in FIG. 2. Beneath a support 2 through which passes a reverse axis 3 there is another support structure, likewise built as extruded section, for the return motion of a roller chain 4.

Figure 1:
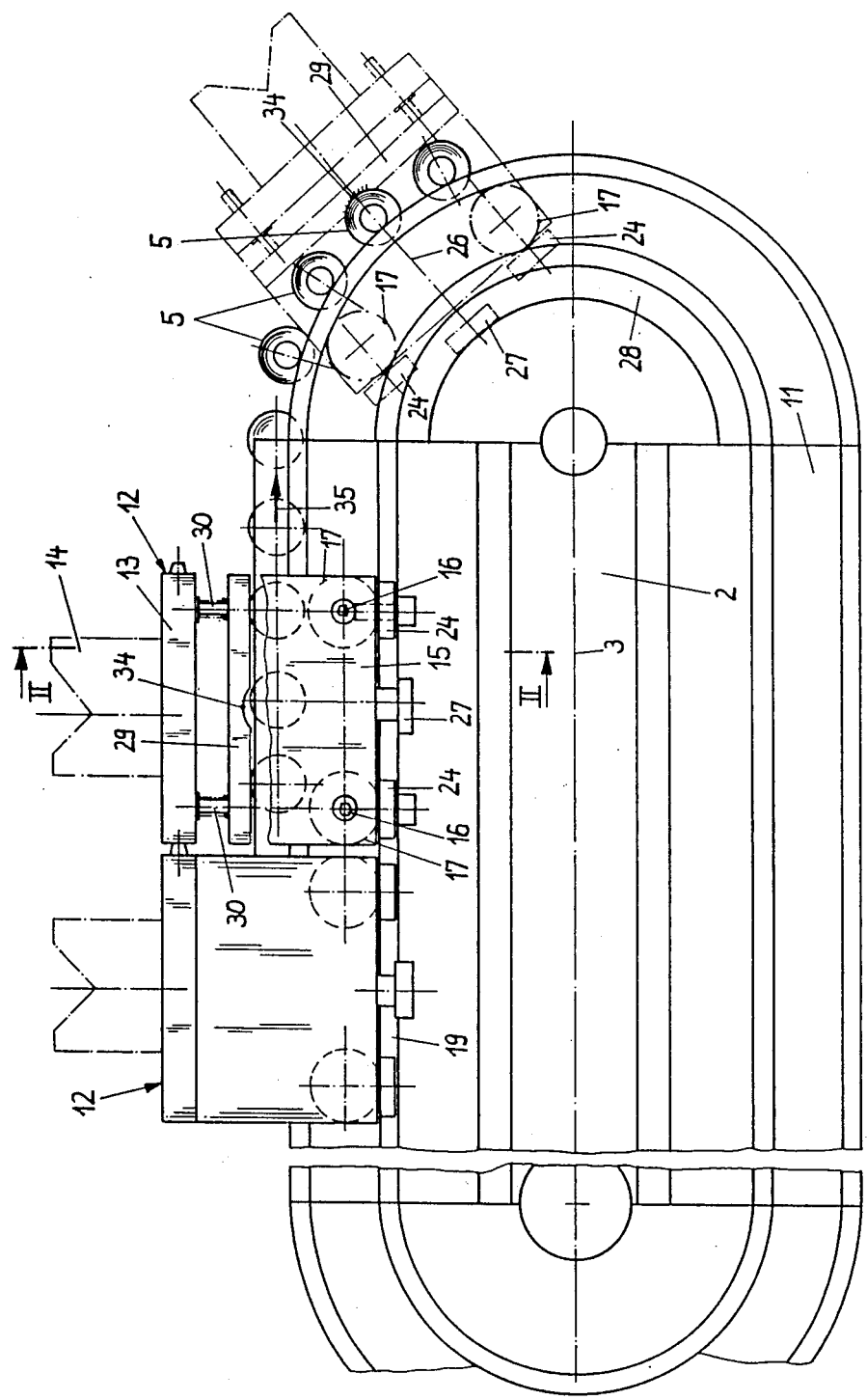
FIG. 1 is a side view of the transportation mechanism according to the invention.
Figure 2:
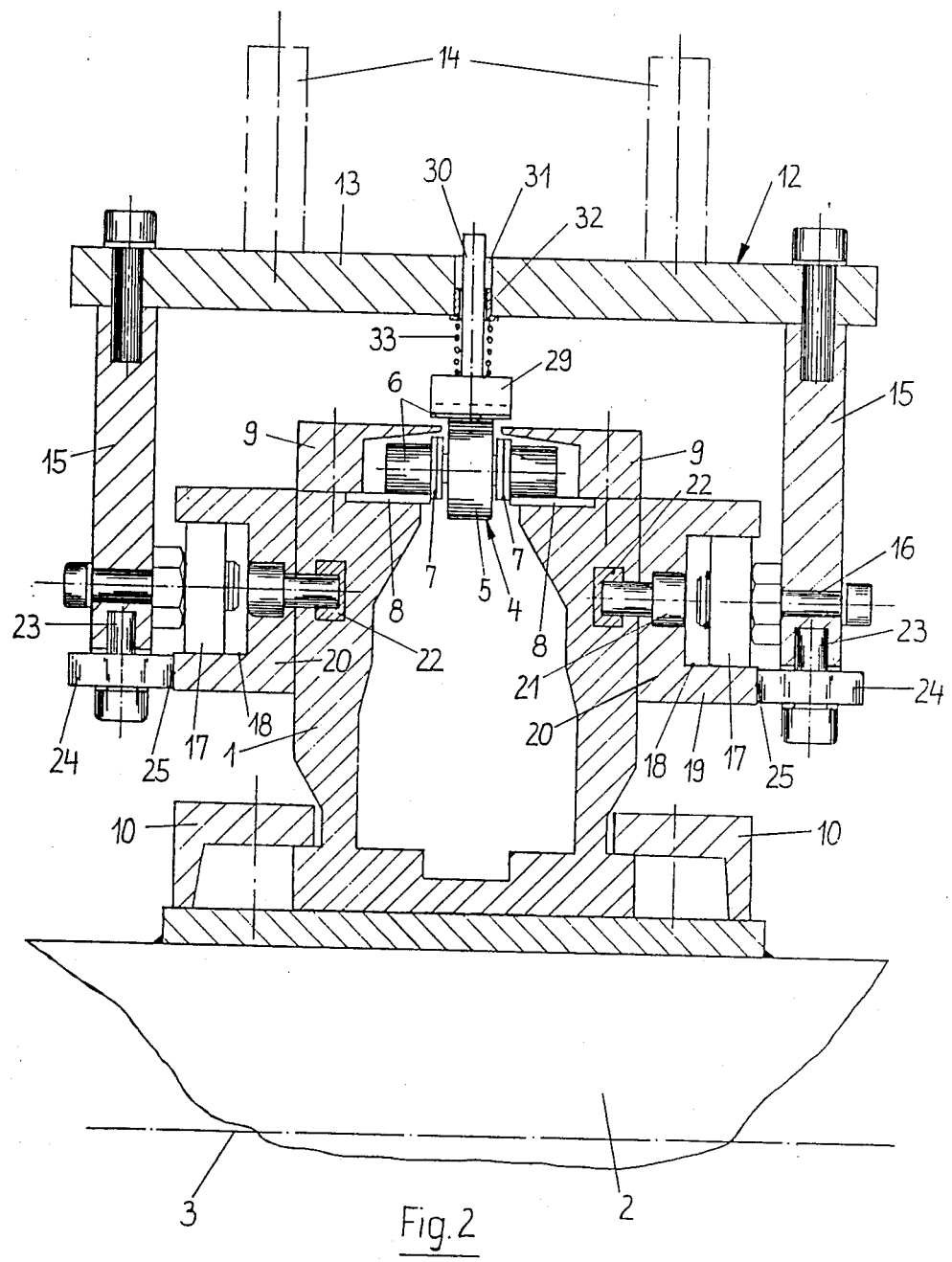
FIG. 2 is an enlarged section on section line II—II of FIG. 1.

The roller chain 4 shown in FIGS. 1 and 2 is a baffle conveyor chain comprising a plurality of links, such as described in German Utility Model 82 27 706. Each link of the chain has a central conveyor roller 5 with tread rollers 6 laterally situated one on either side of it on the same axis. Each chain link is connected to the next link by fishplates 7 disposed between the conveyor and trend rollers 5,6 to form an endless baffle conveyor chain. The tread rollers 6 each run on a spring steel rail 8. For reasons of safety covers 9 cover at least part of the roller chain 4. The support structure 1 is fastened on the support 2 by clamps 10.

In the area of the reversing axes, the support structure 1 is turned 180° to join a return motion element 11, not shown in detail. The drive for the roller chain 5 can also be situated in the return motion element.

On the roller chain there are mounted a plurality of carriages 12, which have a base plate 13 and a workpiece-receiving element 14 built according to the shape and configuration of the object to be transported.

A cover 15 projects downwardly from the base plate 13 of the sliding carriage 12 laterally on the support structure 1.

Respectively on the front and rear areas of the cover 15 there is a bore through which is inserted a shaft 16 of a tread roller 17. The tread roller can be provided with ball bearings. The tread rollers 17 roll on tread tracks 18 on the inner side of a leg 19 of a U-section 20. The U-section 20 is secured to the support structure 1 by screws 21 and blocks 22 which are captive in a groove of the support structure 1. In the return-motion element 11, the upper leg of the U-section 20 in FIG. 2 forms the track for the tread rollers 17.

At the lower end of the cover 15 there is situated, respectively at the front and rear of the carriage, an area of vertical bore in which is mounted the shaft 23 of a guide roller 24. Both guide rollers 24 move on a guide track 25 formed by the outer end of the leg 19 of the U-section 20. As can be seen from FIG. 2, there is obtained in this manner a lateral guidance for the slide carriage 12.

In addition there is in the area of the axis 26 at the lower end of the cover 15 another guide roller 27, which as can be seen in FIG. 1, is at a greater distance from the base plate 13 of the sliding carriage 12 further down than the two guide rollers 17. The central guide roller 27 is thus beneath the track 25.

The mode of operation of the central guide roller 27 can be seen in FIG. 1. In the right half of FIG. 1 a sliding carriage 12 is shown in ghost. As can be seen, both outer guide rollers 24 stand diagonally in respect to the transport direction and would thus slide on the track 25. For this reason the length of the leg 19 in the curved range is shortened so that the guide rollers 24 do not contact with the track 25. Instead of this there is provided in the radial inner area a curved track 28 upon which the central guide roller 27 rolls. Since this guide roller is in the area of the longitudinal pivot axis 26 of the sliding carriage 12, it rolls freely on the curved track. In the area of the return-motion element 11 there are again in use the two outer guide rollers 24 on the leg corresponding to leg 19, while the central guide roller 27 is again free.

Weights and stresses of the sliding carriage and of the objects to be transported are supported by the tread rollers 17. The carriages 12 are conveyed by a carrier bar 29 fastened on two guide pins 30. Both guide pins 30 in the central area of the carriage extend into bores 31 in the base plate. A bearing 32 can additionally be situated in the bore 31 in the base plate 13 for frictionless guidance. Between the base plate 13 and the carrier bars 29 there are disposed springs 33 by which the carrier bar 29 is downwardly pressed on the guide rollers 5.

In the central area the carrier bar has a recess in the shape of a recess 34. The curvature of the cavity is adapted to accommodate the diameter of a conveyor roller 5.

The mode of operation of the carrier bar 29 with the recess 34 becomes clear in particular with reference to FIG. 1. For reasons of clarity only the conveyor rollers 5 of the roller chain 4 have been shown in this figure. As it can be seen, the carrier bar 29 is pressed against two conveyor rollers 5. An additional conveyor roller 5 situated between these conveyor rollers has only partial contact with the underside of the carrier bar 29. By frictional engagement there simultaneously results during the rotation of the roller chain 4 the conveyance of the sliding carriage 12 and therewith a conveyance of the object to be transported in the direction of course of the roller chain, which is shown in FIG. 1 by the arrow 35. If the carriage 12 hits an obstacle superior to the feeding power from the frictional locking, then the sliding carriage 12 remains stationary and the roller chain 4 passes through therebelow. In order to reduce the bumping that can eventually occur, the sliding carriages can be provided with shock absorbers.

In FIG. 1 the station of destination is on the right side before the curved direction change section. After removal of the transported object, the sliding carriage 12 is now conveyed in the reverse direction together with the roller chain 4. This is achieved by means of the cavity 34. As it can be seen from the illustration in dotted lines of the sliding carriage 12, the conveyor rollers 5, which are in the outer area, that is, outside the longitudinal pivot axis 26, have no more contact with the carrier bar 29. But a conveyor roller 5 arrives at the area of the cavity 34 and is pushed into the cavity 34 as results of the contact pressure by the springs 33. In this manner an engagement results and the carriage 12 is moved together with the roller chain 4 in the reverse direction. In the straight return-motion part 11, the carrier bar 29 is again pressed on at least two conveyor rollers 5, the central conveyor roller 5 coming out of the cavity 34 as result of this contact. The sliding carriage 12 is carried along in this area by frictional locking. After a second reverse change, which functions the same as the above described reverse arrangement, the roller chain 4, together with the carriage 12 conveyed thereon, arrives at the receiving station from which the carriages, after being loaded, move to the destination point.

The mechanism according to the invention operates in the same manner when the reverse changes are not in the vertical but are in the horizontal plane. Since in this case lateral pressures and flexural torques occur, it may be desirable to provide additional tread rollers and guide rollers to change their position and shape. Thus, the guide rollers or the tread rollers, for example, may be pivotable.

Figure 3:
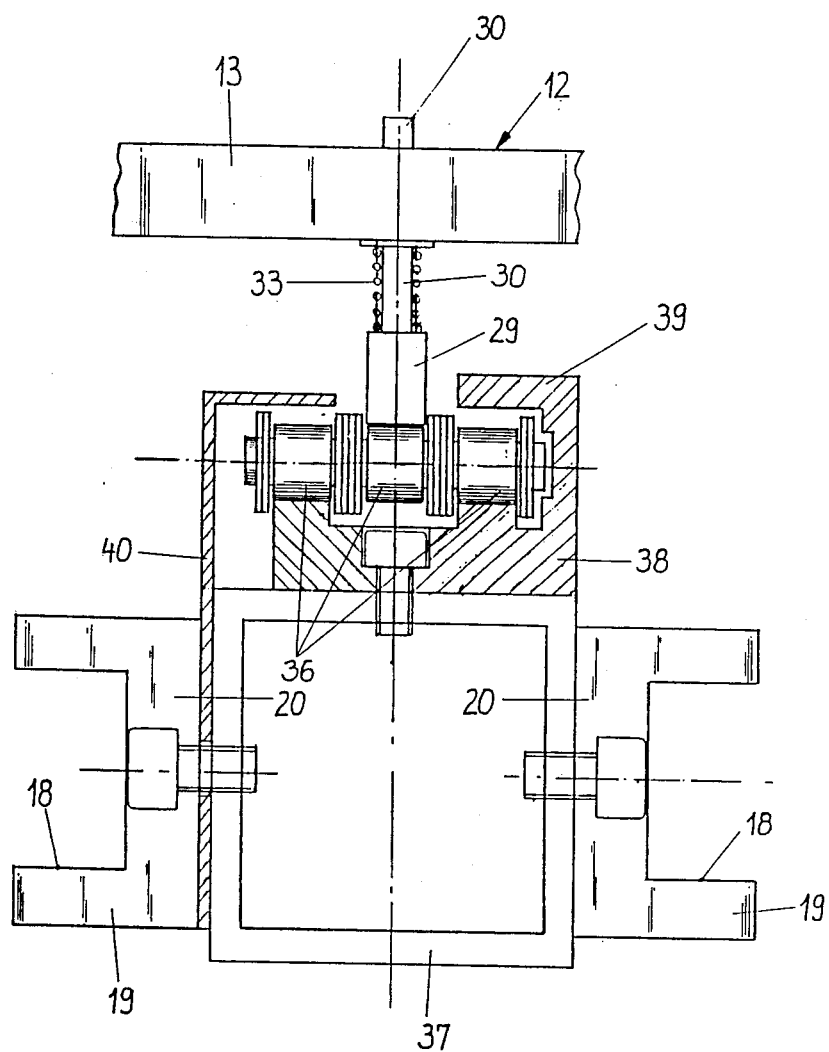
FIG. 3 is a section corresponding to the section according to FIG. 2 with a triplex chain instead of a baffle conveyor chain.

In FIG. 3 is shown as a basic pattern and with only the most essential elements, an embodiment having a triplex chain as the roller chain. The basic pattern with the carrier bar 29 and the cavity 34 situated on the underside is the same here. The triplex chain conventionally comprises three rollers 36 of the same diameter arranged side-by-side. The central roller corresponds to the conveyor roller 5 according to the embodiment in FIGS. 1 and 2. But as a result of its small diameter, the carrier bar 29 must be made narrower in order that it properly engages the central roller 36. The support structure 1 is made of a steel or aluminum square tube 37 on both sides of which the U-sections are fastened. A steel or plastic guide 38 provided on one side with a cover plate 39 integral therewith serves to guide both lateral rollers 36. On the other side a sheet cover 40 forms a protection.

I claim:

1. A mechanism for transportation of objects on an endless rotating roller chain which runs on a support structure, wherein said support structure (1,37) comprising straight and curved conveyor sections connected together end-to-end to form a substantially oval endless path, each conveyor section has an outwardly facing U-section (20) secured to its sides and a rail formed on the top portion of the conveyor section; the roller chain comprising a plurality of links each having at least three rollers (5, 6, 36) on the same axis and each link connected to the next by a fishplate means (7) to form a continuous roller chain, at least one roller of said links engages with said rail; and wherein a plurality of carriages (12), having work piece-receiving elements (14) for accommodating the objects to be transported, are carried by the roller chain, each comprise a base plate (13) having a laterally downwardly projecting cover (15) on each side thereof supporting tread rollers (17) and guide rollers (24) on their lower ends which engage with said U-sections (20) and guide said carriages (12), wherein said carriages (12) being frictionally supported by said roller chain (4), in straight conveyor sections, by means of friction-carrier element (29) and being connected, in curved sections, by a roller engaging recess (34) on said friction-carrier element (29).

2. A mechanism according to claim 1, wherein said friction-carrier element is a carrier bar (29) situated on the underside of each said carriage (12) and resiliently pressible against the rollers (5,36) of said roller chain (4).

3. A mechanism according to claim 1, wherein said U-sections (20) form a tread track (18) on the inner side thereof and a guide track (25) on an outer leg (19) thereof.

4. A mechanism according to claim 2, wherein said carrier bar (29) has on its side facing said rollers (5,36) said recess (34) having a radius adapted to the diameter of said rollers (5,36).

5. A mechanism according to claim 3 wherein said tread rollers (17) engage with said tread track (18) and said guide rollers (24) engage with said guide track (25).

6. A mechanism according to claim 1, wherein the U-sections (20) on each side of said support structure (1,37) form on the inner side thereof a tread track (18) extending parallel with said roller chain (4) to support and guide the tread rollers (17) of said carriages (12) as they are conveyed in the direction of transportation.

7. A mechanism according to claim 6, wherein said guide rollers (24) engage a guide track (25), formed on an outer leg (19) of said U-section (20), and provide additional guidance.

8. A mechanism according to claim 7, wherein on each side of said carriage (12) there are situated at least two spaced apart guide rollers (24).

9. A mechanism according to claim 8, wherein between said at least two guide rollers (24), in the area of a longitudinal pivotal axis (26) of said carriage (12), a third guide roller (27) is situated which is at a greater distance from the top side of said carriage (12) than the two other guide rollers (24) and which, in the curved conveyor sections, moves on a curved track (28), while both of the other guide rollers (24) being disposed in the sections so as to have no contact with their track (25).

10. A mechanism according to claim 1, wherein said roller chain (4) is a baffle roller chain (4) having conveyor rollers (5) and tread rollers (6).

11. A mechanism according to claim 1, wherein said roller chain (4) is a triplex roller chain having rollers (36).

12. A mechanism according to claim 1, wherein said endless path lies in a horizontal plane.

13. A mechanism according to claim 1, wherein said endless path lies in a vertical plane.

* * * * *